US011025607B2

United States Patent
Narayanan et al.

(10) Patent No.: US 11,025,607 B2
(45) Date of Patent: Jun. 1, 2021

(54) V2X CERTIFICATE MANAGEMENT

(71) Applicants: AT&T Mobility II LLC, Atlanta, GA (US); AT&T Intellectual Property II, L.P., Atlanta, GA (US)

(72) Inventors: Murali Narayanan, Redmond, WA (US); Roger Mahler, Marietta, GA (US); Paul Nichols, Cumming, GA (US); George Murphy, Holly Springs, NC (US); Zachery Carter, Cumming, GA (US); Senthil Ramakrishnan, Atlanta, GA (US); Thomas Becker, Atlanta, GA (US)

(73) Assignees: AT&T Mobility II LLC, Atlanta, GA (US); AT&T Intellectual Property II, L.P., Atlanta, GA (US)

( * ) Notice: Subject to any disclaimer, the term of this patent is extended or adjusted under 35 U.S.C. 154(b) by 582 days.

(21) Appl. No.: 15/380,992

(22) Filed: Dec. 15, 2016

(65) Prior Publication Data
US 2018/0176209 A1 Jun. 21, 2018

(51) Int. Cl.
*H04L 29/06* (2006.01)
*H04W 48/10* (2009.01)
(Continued)

(52) U.S. Cl.
CPC ........... *H04L 63/0823* (2013.01); *H04W 4/40* (2018.02); *H04W 12/069* (2021.01); *H04W 48/10* (2013.01); *H04W 84/005* (2013.01)

(58) Field of Classification Search
CPC .... H04L 63/0823; H04W 4/40; H04W 12/06; H04W 48/10
See application file for complete search history.

(56) References Cited

U.S. PATENT DOCUMENTS 8,549,284 B1 * 10/2013 Kherani ................ H04W 12/06
 380/229
8,819,414 B2 8/2014 Bellur et al.
(Continued)

OTHER PUBLICATIONS

"Mobile Network Public Warning Systems and the Rise of Cell-Broadcast" (PDF). www.gsma.com. GSMA. Jan. 2013. (Year: 2013).*
(Continued)

*Primary Examiner* — Venkat Perungavoor
*Assistant Examiner* — Devin E Almeida
(74) *Attorney, Agent, or Firm* — Hartman & Citrin LLC

(57) ABSTRACT

Concepts and technologies disclosed herein are directed to vehicle-to-everything ("V2X") certificate management. According to one aspect of the concepts and technologies disclosed herein, a system can receive a CRL from a security credential management ("SCM") system. The CRL can identify one or more certificates that have been determined to be invalid, such as when the certificate(s) has expired. The certificate(s) can be utilized by a vehicle for secure communications, including vehicle-to-vehicle ("V2V") and vehicle-to-infrastructure ("V2I") (collectively V2X). The system can format the CRL as a cell broadcast message. The system can then create a cell broadcast request directed to a cell broadcast center ("CBC"). The cell broadcast request can include the CRL formatted as the cell broadcast message. The system can send the cell broadcast request to the CBC to instruct the CBC to broadcast the CRL as the cell broadcast message.

17 Claims, 6 Drawing Sheets

(51) Int. Cl.
*H04W 4/40* (2018.01)
*H04W 12/069* (2021.01)
*H04W 84/00* (2009.01)

(56) References Cited

U.S. PATENT DOCUMENTS

| | | |
|---|---|---|
| 8,904,183 B2 | 12/2014 | Bellur et al. |
| 8,930,041 B1 | 1/2015 | Grimm et al. |
| 9,021,256 B2 | 4/2015 | Zhang et al. |
| 9,094,206 B2 | 7/2015 | Di Crescenzo et al. |
| 9,135,820 B2 | 9/2015 | Ando et al. |
| 9,461,827 B2 | 10/2016 | Laberteaux et al. |
| 2006/0095965 A1* | 5/2006 | Phillips ............... H04L 63/1441 726/22 |
| 2006/0156391 A1* | 7/2006 | Salowey ............. H04L 63/0823 726/5 |
| 2007/0077922 A1* | 4/2007 | Kim ...................... H04L 12/189 455/414.2 |
| 2008/0070546 A1* | 3/2008 | Lee ........................ H04W 4/90 455/404.2 |
| 2009/0249062 A1* | 10/2009 | Thomas .............. H04L 63/0823 713/158 |
| 2009/0254993 A1* | 10/2009 | Leone .................... G06F 21/57 726/25 |
| 2010/0325419 A1* | 12/2010 | Kanekar ............ H04L 63/0823 713/151 |
| 2011/0083011 A1* | 4/2011 | DiCrescenzo ........ H04L 9/0891 713/158 |
| 2011/0191581 A1 | 8/2011 | Shim et al. |
| 2011/0213968 A1* | 9/2011 | Zhang .................... H04L 63/20 713/158 |
| 2011/0258435 A1* | 10/2011 | Bellur ................... H04L 9/3268 713/158 |
| 2013/0145157 A1* | 6/2013 | Lin ....................... H04L 9/3268 713/158 |
| 2015/0256347 A1* | 9/2015 | Tseng ................... H04L 9/3265 713/158 |
| 2015/0271297 A1* | 9/2015 | Zimmer ................ G06F 9/4416 709/203 |
| 2015/0318996 A1* | 11/2015 | van Roermund ....... H04L 9/006 713/158 |
| 2016/0087804 A1 | 3/2016 | Park et al. |
| 2016/0119151 A1 | 4/2016 | Park et al. |
| 2016/0140842 A1 | 5/2016 | Park et al. |
| 2016/0212601 A1* | 7/2016 | Braun ................... H04W 4/027 |
| 2016/0295624 A1 | 10/2016 | Novlan et al. |

OTHER PUBLICATIONS

"Mobile Network Public Warning Systems and the Rise of Cell-Broadcast" (PDF). https://www.gsma.com/mobilefordevelopment/wp-content/uploads/2013/01/Mobile-Network-Public-Warning-Systems-and-the-Rise-of-Cell-Broadcast.pdf. GSMA. Jan. 2013. (Year: 2013).*

Yogesh Kondareddy et. al. "Analysis of Certificate Revocation List Distribution Protocols for Vehicular Networks" 2010 IEEE Global Telecommunications Conference GLOBECOM 2010 (Year: 2011).*

Hsu et al., "Challenges, Approaches, and Solutions in Intelligent Transportation Systems," 2010 Second International Conference on Ubiquitous and Future Networks (ICUFN), Jun. 16-18, 2010, pp. 366-371, IEEE.

"Leading the world to 5G: Cellular Vehicle-to-Everything (C-V2X) technologies," Qualcomm, Jun. 2016.

* cited by examiner

V2X CERTIFICATE MANAGEMENT

BACKGROUND

Autonomous vehicles, vehicle-to-vehicle ("V2V"), and vehicle-to-infrastructure ("V2I") solutions depend on secure communication between vehicles, and between vehicles and infrastructure equipment. To ensure security and integrity of these communications, digital security certificates are exchanged among the communication end points. These certificates should be periodically updated and revoked to ensure the integrity of overall system.

SUMMARY

Concepts and technologies disclosed herein are directed to vehicle-to-everything ("V2X") certificate management. According to one aspect of the concepts and technologies disclosed herein, a system can receive a certificate revocation list ("CRL") from a security credential management ("SCM") system. The CRL can identify one or more certificates that have been determined to be invalid, such as when the certificate(s) has expired, compromised, or revoked for some reason. The certificate(s) can be utilized by a vehicle for secure communications, including V2V and V2I (collectively V2X). The system can format the CRL as a cell broadcast message. The system can then create a cell broadcast request directed to a cell broadcast center ("CBC"). The cell broadcast request can include the CRL formatted as the cell broadcast message. The system can send the cell broadcast request to the CBC to instruct the CBC to broadcast the CRL as the cell broadcast message. The system also can determine jointly with the SCM system in what geographic area(s) the CLR should be broadcast.

In some embodiments, the CRL is generated by the SCM system in response to the SCM system determining that the certificate is invalid. In other embodiments, the CRL is generated by the SCM system in response to a request received from the vehicle. In some embodiments, the certificate has been determined to be invalid because the certificate has expired.

In some embodiments, the system also can receive configuration information for how to configure the cell broadcast message for broadcasting the CRL. The configuration information can include an area to which the CRL is to be broadcast. The configuration information can include a frequency with which the CRL is to be broadcast. The configuration information can include a time period during which the certificate revocation list is to be broadcast.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

Figure 1:
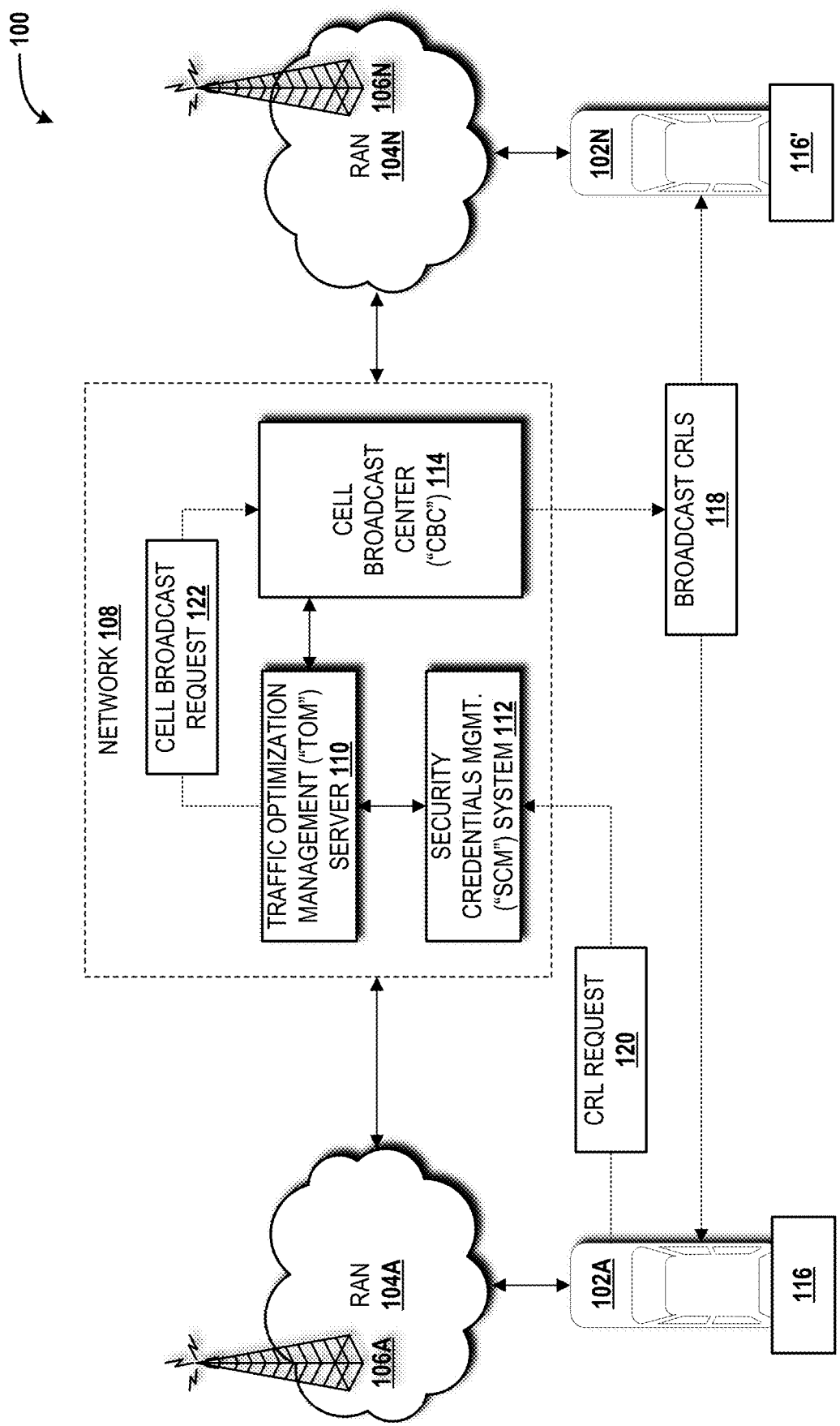
FIG. 1 is a block diagram illustrating aspects of an illustrative operating environment for various concepts disclosed herein.

Concepts and technologies disclosed herein are directed to V2X certificate management. The concepts and technologies disclosed herein enable V2X certificates and the certificate revocation lists ("CRL") to be efficiently distributed to vehicles in a timely manner. Certificates and CRLS are to be distributed to every vehicle that has V2X (i.e., V2V and/or V2I) capability. The United States is taking the lead to mandate this capability in cars sold in the United States with a current expectation of the mandate becoming effective in 2021. By 2025, tens of millions of cars on the road are expected to have V2X capability.

A system to coordinate the distribution of CRLs therefore will need to be efficient and have the ability to distribute CRLs in a timely manner. There are three viable options to facilitate the distribution of CRLs: (1) satellite technology; (2) road side equipment; and (3) cell broadcast. Satellite technology has to overcome two challenges—namely, the cost of a satellite radio and antenna system in every vehicle, and good satellite communication performance in urban areas, inside buildings, garages, other parking structures, and the like. Road side equipment requires deployment of 100s of thousands of road side equipment around the United States, and the cost and effort to accomplish this is non-trivial. The concepts and technologies disclosed herein support the use of cell broadcast, which utilizes existing mobile wireless network infrastructure. Mobile wireless networks have large coverage areas with limited areas of poor or no coverage. This, coupled with the fact that many, if not all newly-manufactured vehicles will include built-in mobile wireless radios, makes cell broadcast the most viable of the aforementioned options. The concepts and technologies disclosed herein can, in some embodiments, utilize a combination of broadcast and on-demand unicast to distribute CRLs. Moreover, unicast can be used to "top up" certificates to a particular vehicle. It should be understood that the concepts and technologies disclosed herein are not limited to certificate management for vehicles, and instead are applicable across any domain and any technology. Accordingly, the concepts and technologies disclosed herein should not be construed as being limited to vehicle certificates.

While the subject matter described herein may be presented, at times, in the general context of program modules that execute in conjunction with the execution of an operating system and application programs on a computer system, those skilled in the art will recognize that other implementations may be performed in combination with other types of program modules. Generally, program modules include routines, programs, components, data structures, computer-executable instructions, and/or other types of structures that perform particular tasks or implement particular abstract data types. Moreover, those skilled in the art will appreciate that the subject matter described herein may be practiced with other computer systems, including handheld devices, vehicles, wireless devices, multiprocessor systems, distributed computing systems, microprocessor-based or programmable consumer electronics, minicomputers, mainframe computers, routers, switches, other computing devices described herein, and the like.

In the following detailed description, references are made to the accompanying drawings that form a part hereof, and in which are shown by way of illustration specific embodiments or examples. Referring now to the drawings, in which like numerals represent like elements throughout the several figures, aspects of V2X certificate management will be described.

Referring now to FIG. 1, aspects of an illustrative operating environment 100 for various concepts disclosed herein will be described. It should be understood that the operating environment 100 and the various components thereof have been greatly simplified for purposes of discussion. Accordingly, additional or alternative components of the operating environment 100 can be made available without departing from the embodiments described herein.

The operating environment 100 includes a plurality of vehicles 102A-102N. Each of the plurality of vehicles 102A-102N can be a car, truck, van, motorcycle, moped, go-kart, golf cart, or any other ground-based vehicle configured to transport one or more passengers and/or cargo. Each of the plurality of vehicles 102A-102N can be driven by a person. Each of the plurality of vehicles 102A-102N, in some embodiments, is capable of operating in at least a partially autonomous control mode. Each of the plurality of vehicles 102A-102N, in some embodiments, is a fully autonomous vehicle. In some embodiments, each of the plurality of vehicles 102A-102N can operate as a level 3 or level 4 vehicle as defined by the National Highway Traffic Safety Administration ("NHTSA"). The NHTSA defines a level 3 vehicle as a limited self-driving automation vehicle that enables a driver to cede full control of all safety-critical functions under certain traffic or environmental conditions, and in those conditions to rely heavily on the vehicle to monitor for changes that require transition back to driver control. In a level 3 vehicle, the driver is expected to be available for occasional control, but with sufficiently comfortable transition time. The GOOGLE car, available from GOOGLE, is an example of a limited self-driving automation vehicle. The NHTSA defines a level 4 vehicle as a full self-driving automation vehicle that is designed to perform all safety-critical driving functions and monitor roadway conditions for an entire trip to a destination. Such a design anticipates that a user will provide destination or navigation input, but is not expected to be available for control at any time during the trip. This includes both occupied and unoccupied vehicles. The plurality of vehicles 102A-102N can include any combination of the aforementioned vehicle types and can have any combination of capabilities with regard to autonomy.

Each of the plurality of vehicles 102A-102N can be configured to connect to and communicate with one or more radio access networks ("RANs") 104A-104N over an air/radio interface provided, at least in part, by one or more base stations 106A-106N. The RAN(s) 104 can include one or more cells, each of which is served by one or more of the base stations 106. As used herein, a "cell" refers to a geographical area that is served by one or more base stations operating within the RAN 104. As used herein, a "base station" refers to a radio receiver and/or transmitter (collectively, transceiver) that is/are configured to provide a radio/air interface by which devices can connect to a network 108. Accordingly, a base station is intended to encompass one or more base transceiver stations ("BTSs"), one or more NodeBs, one or more eNodeBs, and/or other networking nodes that are capable of providing a radio/air interface regardless of the technologies utilized to do so. A base station can be in communication with one or more antennas (not shown), each of which may be configured in accordance with any antenna design specifications to provide a physical interface for receiving and transmitting radio waves. The concepts and technologies disclosed herein will be described in context of the base stations 106 being eNodeBs operating in accordance with Long-Term Evolution ("LTE") standards. Those skilled in the art will appreciate the applicability of the concepts and technologies disclosed herein to other mobile telecommunications technologies and standards, some of which are expressly noted below.

The network 108 can be or can include one or more wireless wide area networks ("WWANs"), which may, in turn, include one or more core networks such as a circuit-switched core network ("CS CN"), a packet-switched core network ("PS CN"), an IP multimedia subsystem ("IMS") core network, an evolved packet core ("EPC"), multiples thereof, and/or combinations thereof. The WWAN can utilize one or more mobile telecommunications technologies, such as, but not limited to, Global System for Mobile communications ("GSM"), Code Division Multiple Access ("CDMA") ONE, CDMA2000, Universal Mobile Telecommunications System ("UMTS"), LTE, Worldwide Interoperability for Microwave Access ("WiMAX"), other 802.XX technologies (e.g., 802.11 WI-FI), and the like. The RANs 104A-104N can utilize various channel access methods (which might or might not be used by the aforementioned standards) including, but not limited to, Time Division Multiple Access ("TDMA"), Frequency Division Multiple Access ("FDMA"), Single Carrier FDMA ("SC-FDMA"), CDMA, wideband CDMA ("W-CDMA"), Orthogonal Frequency Division Multiplexing ("OFDM"), Space Division Multiple Access ("SDMA"), and/or the like to provide a radio/air interface to the vehicles 102. Data communications can be provided in part by the RANs 104A-104N using General Packet Radio Service ("GPRS"), Enhanced Data rates for Global Evolution ("EDGE"), the High-Speed Packet Access ("HSPA") protocol family including High-Speed Downlink Packet Access ("HSDPA"), Enhanced Uplink ("EUL") or otherwise termed High-Speed Uplink Packet Access ("HSUPA"), Evolved HSPA ("HSPA+"), LTE, and/or various other current and future wireless data access technologies. Moreover, a RAN may be a GSM RAN ("GRAN"), a GSM EDGE RAN ("GERAN"), a UMTS Terrestrial Radio Access Network ("UTRAN"), an E-UTRAN (such as in the example provided herein), any combination thereof, and/or the like.

The illustrated network 108 includes a traffic optimization management ("TOM") server 110, a security credential management ("SCM") system 112, and a cell broadcast center ("CBC") 114. The TOM server 110 provides enhanced security, safety, and information to cellular-equipped vehicles, such as the vehicles 102. The TOM server 110 can function as a message interceptor, message interrogator, traffic analysis system, and rules-based routing system for messages. The SCM system 112 is responsible for managing, sending, and updating security certificates 116, 116' (collectively, "certificates 116") within the vehicles 102 and with roadside equipment (not shown). The certificates 116 can be used to securely exchange messages V2V and/or V2I (collectively, V2X). The certificates 116 can be installed on designated short-range communications ("DSRC") components (best shown in FIG. 2) or in vehicle memory (also best shown in FIG. 2) and can be used for the secure transmission among the vehicles 102. The CBC 114 controls sending cell broadcast messages to cell broadcast-enabled devices, such as the vehicle 102. In context of the concepts and technologies disclosed herein, the CBC 114 can, among other things, send security certificates 116 and certificate revocation lists ("CRLs") 118 to the vehicles 102 via cell broadcast.

In some embodiments, LTE-V2X technology is utilized. It should be understood, however, that the exchange of the certificates 116 between the vehicles 102, between the vehicles 102 and infrastructure (e.g., roadside equipment) and/or any other system, component, or entity can be technology agnostic. As such, the embodiments disclosed herein that describe specific technologies used to exchange the certificates 116 should not be construed as being limited in any way.

The SCM system 112 is primarily responsible for management of the certificates 116 and information related to the invalidation, revocation, and reissuance of the certificates 116. Providing the certificates 116 to a large number of vehicles 102 over large areas, such as across multiple RANs 104 as in the illustrated example, is not easily managed by the SCM system 112 alone. Although the SCM system 112 is capable of providing the certificates 116 both at large and on a transactional basis, the unique characteristics of the vehicles 102 (i.e., mobility) mandates a more flexible system of communication and notification. More particularly, the fact that the vehicles 102 are not permanently attached to a network, and are not always online or available, makes mass communication more difficult. Moreover, the vehicles 102 are mobile and travel through areas where network connectivity is insufficient or unavailable. In addition, the vehicles 102 can be turned off and remain in this state for long periods of time. The concepts and technologies disclosed herein meet these challenges by providing a time and duration-based system that allows for a more flexible way to ensure that the majority of vehicles 102 presently operating within a certain region receive CRLs 118 so that the vehicles 102 do not attempt to use a certificate that is invalid.

By using the TOM server 110 and the CBC 114, the SCM system 112 can use a cellular broadcast system in order to broadcast the CRLs 118 to the vehicles 102. The SCM system 112 can send the CRLs 118 of invalid and revoked certificates to the TOM server 110. The TOM server 110 can disseminate the information included in the CRLs 118 to the CBC 114 for broadcast via cell broadcast message to the vehicles 102. By utilizing the CBC 114, all vehicles within a locale, region, or domain can be sent the CRLs 118 via cellular broadcasts. The publication area as well as the frequency and time periods of when these messages are to be sent is configurable. In some embodiments, this configuration information can be contained in messages sent by the SCM system 112 to the TOM server 110 for cellular broadcasts.

The vehicle 102A and/or the SCM system 112 can determine that one or more of the certificates 116 associated with the vehicle 102A is invalid. A certificate 116 can be invalid if it has expired or has become compromised for some other reason. A certificate 116 can be compromised due to a vehicle 102 being hacked, a global positioning system ("GPS") not functioning, another component failure or malfunction, erroneous speed information, or for any other reason that causes the vehicle 102 to function in an abnormal way. What constitutes a certificate 116 being compromised can be defined by an entity that has an interest in the security of the vehicle 102 to which the certificate 116 is assigned. Some example entities include, but are not limited to, a vehicle manufacturer, the vehicle 102 itself, a service provider that provides connectivity to the vehicle 102 (e.g., via the RAN 104), a user of the vehicle 102, or an owner of the vehicle 102. It should be understood that a certificate 116 can be revoked even if that certificate 116 is valid. A certificate 116 may be revoked for any reason. If the vehicle 102A determines that one or more of the certificates 116 is invalid, the vehicle 102A can generate a CRL request 120 directed to the SCM system 112. The CRL request 120 can identify one or more certificates 116 that are invalid. In response to the CRL request 120, the SCM system 112 can determine that a CRL 118 is needed to notify other vehicles, such as the vehicle 102N, of the certificates 116 determined to be invalid. The SCM system 112 can then create the CRL 118, including configuration information, such as an area in which the CRL 118 should be broadcast, a frequency with which the CRL 118 should be broadcast to the area, and a time period (e.g., in number of hours) in which to send the CRL 118. The SCM system 112 can then send the CRL 118 to the TOM server 110. In some embodiments, the SCM system 112 can send the CRL 118 to the TOM server 110 using secure socket layer ("SSL") and RESTful web service(s), although other implementations are contemplated.

The TOM server 110 receives the CRL 118 from the SCM system 112 and consumes information of the CRL 118 to format the CRL 118 into a cell broadcast request 120 towards the CBC 114. In some embodiments, the CBC 114 can expose one or more application programming interfaces ("APIs") that the SCM system 112 can call to provide the cell broadcast request 122 to the CBC 114.

The CBC 114 can receive the cell broadcast request 122 from the TOM server 110 through an API, if applicable. The CBC 114, in response, can extract the content of the cell broadcast request 122 and can begin broadcasting cell broadcast messages including the CRL (i.e., broadcast CRL 118 in the illustrated example). The cell broadcast messages are sent until the duration or time cycle ends. In some embodiments, these broadcasts are cyclical and not continual broadcasts.

In some embodiments, the TOM server 110 can maintain a certificate version database table (not shown) that contains information regarding CRL versions. This information can include, for example, an ID for the CRL, a certificate version, a region/zone, a data description, one or more message formatting rules, an effective date, an expiration data, and a route to destination. The TOM server 110 can request that the CBC 114 send a certificate version broadcast (not shown) to the vehicle(s) 102 after or in addition to the broadcast CRLs 118. The certificate version broadcast can contain an informational segment that the CBC 114 can use to inform the vehicle(s) 102 of the latest version of certificates that have been deployed to a locale or region.

It should be understood that some implementations of the operating environment 100 include one or more vehicle occupants (not shown), one or more road side equipment devices (not shown), one or more user devices (not shown), one or more RANs 104, one or more base stations 106, one or more TOM servers 110, one or more SCM systems 112, one or more CBCs 114, one or more certificates 116, one or more (broadcast) CRLs 118, one or more CRL requests 120, one or more broadcast requests 122, or any combinations thereof. Thus, the illustrated embodiment should be understood as being illustrative, and should not be construed as being limiting in any way.

Figure 2:
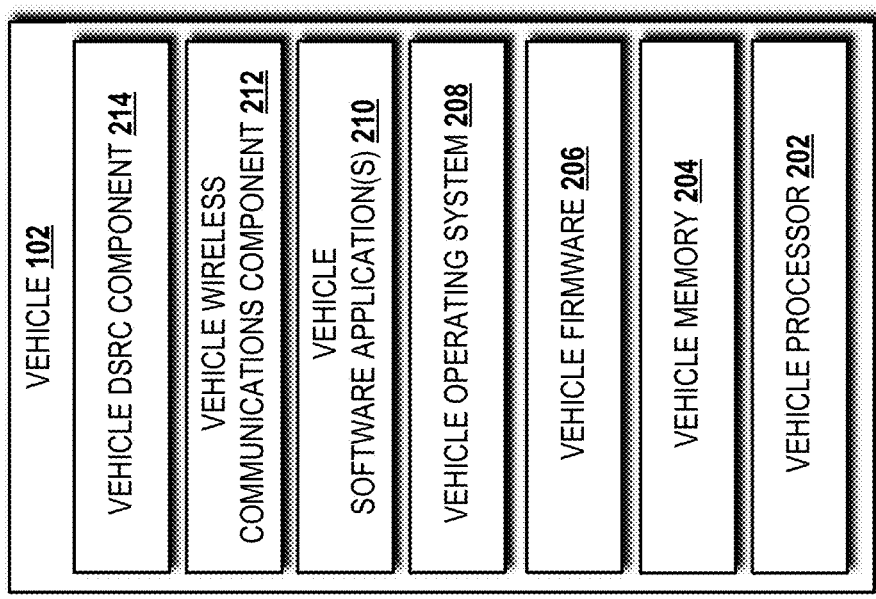
FIG. 2 is a block diagram illustrating aspects of a vehicle capable of implementing aspects of the embodiments disclosed herein.

Turning now to FIG. 2, a block diagram illustrating an example vehicle 102 and components thereof will be described, according to an illustrative embodiment of the concepts and technologies disclosed herein. The illustrated vehicle 102 includes a vehicle processor 202, a vehicle memory 204, a vehicle firmware 206, a vehicle operating system 208, one or more vehicle software application 210, a vehicle wireless communications component 212, and a dedicated short-range communications ("DSRC") component 214. Each of this components will now be described in detail.

The vehicle processor 202 can include one or more hardware components that perform computations to process data, and/or to execute computer-executable instructions of one or more application programs such as the vehicle software application(s) 210, one or more operating systems such as the vehicle operating system 208, other software, and/or the vehicle firmware 206. The vehicle processor 202 can include one or more central processing units ("CPUs") configured with one or more processing cores. The vehicle processor 202 can include one or more graphics processing unit ("GPU") configured to accelerate operations performed by one or more CPUs, and/or to perform computations to process data, and/or to execute computer-executable instructions of one or more application programs, operating systems, and/or other software that may or may not include instructions particular to graphics computations. In some embodiments, the vehicle processor 202 can include one or more discrete GPUs. In some other embodiments, the vehicle processor 202 can include CPU and GPU components that are configured in accordance with a co-processing CPU/GPU computing model, wherein the sequential part of an application executes on the CPU and the computationally-intensive part is accelerated by the GPU. The vehicle processor 202 can include one or more system-on-chip ("SoC") components along with one or more other components illustrated as being part of the vehicle 102, including, for example, the vehicle memory 204, the vehicle wireless communications component 212, the DSRC component 214, or some combination thereof. In some embodiments, the vehicle processor 202 can be or can include one or more SNAPDRAGON SoCs, available from QUALCOMM of San Diego, Calif.; one or more TEGRA SoCs, available from NVIDIA of Santa Clara, Calif.; one or more HUMMINGBIRD SoCs, available from SAMSUNG of Seoul, South Korea; one or more Open Multimedia Application Platform ("OMAP") SoCs, available from TEXAS INSTRUMENTS of Dallas, Tex.; one or more customized versions of any of the above SoCs; and/or one or more proprietary SoCs. The vehicle processor 202 can be or can include one or more hardware components architected in accordance with an ARM architecture, available for license from ARM HOLDINGS of Cambridge, United Kingdom. Alternatively, the vehicle processor 202 can be or can include one or more hardware components architected in accordance with an x86 architecture, such an architecture available from INTEL CORPORATION of Mountain View, Calif., and others. Those skilled in the art will appreciate the implementation of the vehicle processor 202 can utilize various computation architectures, and as such, the vehicle processor 202 should not be construed as being limited to any particular computation architecture or combination of computation architectures, including those explicitly disclosed herein.

The vehicle memory 204 can include one or more hardware components that perform storage operations, including temporary or permanent storage operations. In some embodiments, the vehicle memory 204 include volatile and/or non-volatile memory implemented in any method or technology for storage of information such as computer-readable instructions, data structures, program modules, the vehicle operating system 208, the vehicle firmware 206, the vehicle software application(s) 210, and/or other software, firmware, and/or other data disclosed herein. Computer storage media includes, but is not limited to, random access memory ("RAM"), read-only memory ("ROM"), Erasable Programmable ROM ("EPROM"), Electrically Erasable Programmable ROM ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store data and which can be accessed by the vehicle processor 202.

The vehicle firmware 206, also known as microcode, can be written onto a ROM of the vehicle memory 204. The vehicle firmware 206 can be written on the ROM at the time of manufacturing and is used to execute programs on the vehicle processor 202. In some embodiments, the vehicle firmware 206 includes the vehicle operating system 208. In some embodiments, the vehicle firmware 206 is the vehicle operating system 208. In some embodiments, the vehicle firmware 206 and the vehicle operating system 208 are closely integrated for performance of operations of the vehicle 102.

The vehicle operating system 208 can control the operation of at least a portion of the vehicle 102. In some embodiments, the vehicle operating system 208 includes the functionality of the vehicle firmware 206 and/or the vehicle software application(s) 210. The vehicle operating system 208 can be executed by the vehicle processor 202 to cause the vehicle 102 to perform various operations. The vehicle operating system 208 can include a member of the SYMBIAN OS family of operating systems from SYMBIAN LIMITED, a member of the WINDOWS OS, WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems or a member of the OS X family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The vehicle software application(s) 210 can execute on top of the vehicle operating system 208. The vehicle software application(s) 210 can be executed by the vehicle processor 202 to cause the vehicle 102 to perform various operations described herein. For example, the vehicle software application(s) 210 can be part of a vehicle entertainment system, a vehicle navigation system, a vehicle ECU, and/or another computing system of the user vehicle.

The vehicle wireless communications component 212 can include one or more WWAN components capable of facilitating communication with one or more WWANs, such as the network 108 via the RAN 104. In some embodiments, the vehicle wireless communications component 212 is configured to provide multi-mode connectivity. For example, the vehicle wireless communications component 212 may be configured to provide connectivity to the RAN 104, wherein the RAN 104 functions in accordance with UMTS and LTE technologies, or via some other combination of technologies, and more particularly, one or more technologies that support cell broadcast functionality.

The DSRC component 214 can be a radio communications device that can send and receive messages V2V. In some embodiments, the DSRC component 214 is configured to operate within a 5.9 GHz radio frequency band as defined by the United States Department of Transportation. In some embodiments, the DSRC component 214 is configured to operate within other radio frequency bands.

Figure 3:
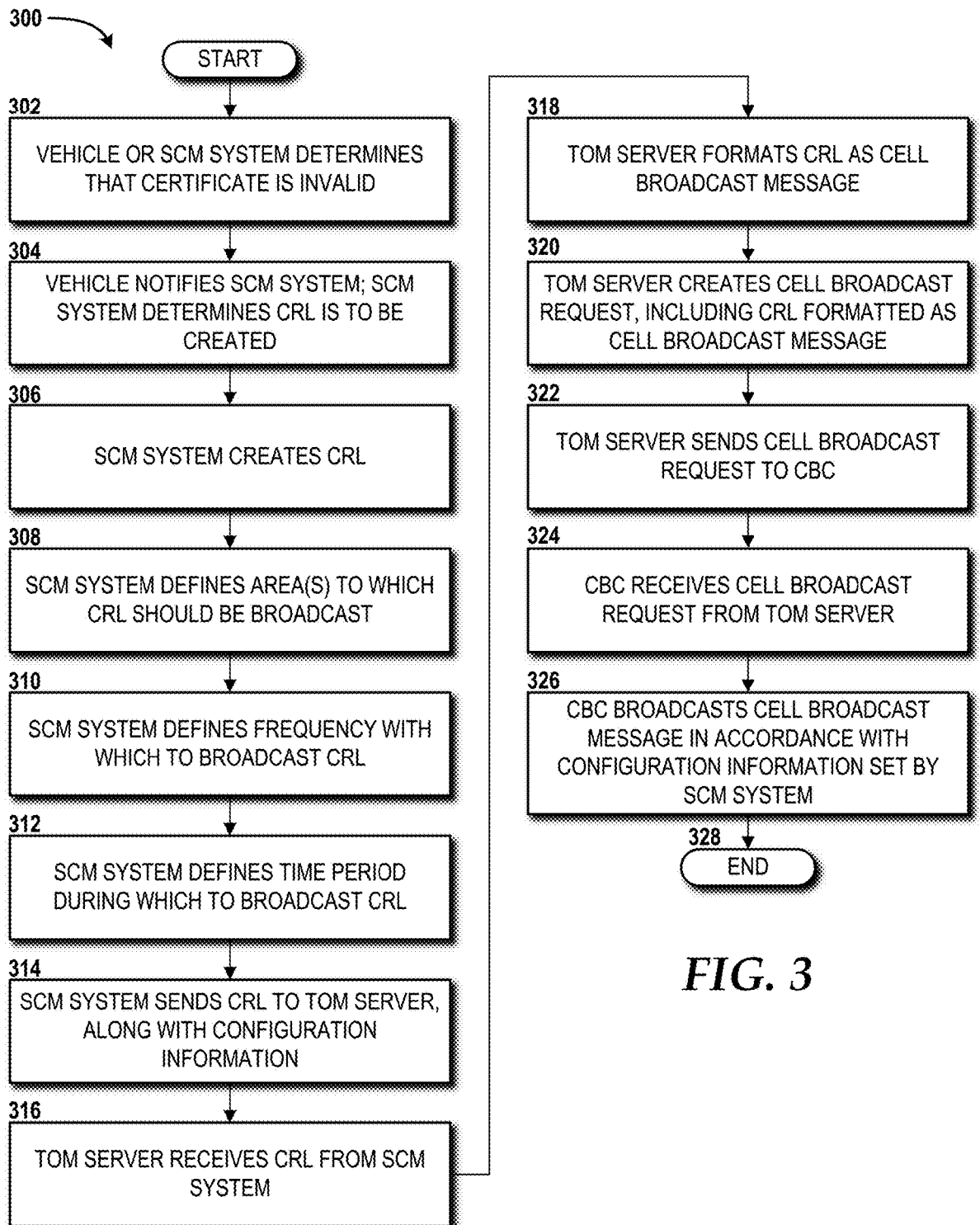
FIG. 3 is a flow diagram illustrating aspects of a method for managing V2X certificates, according to an illustrative embodiment of the concepts and technologies disclosed herein.

Turning now to FIG. 3, a flow diagram illustrating aspects of a method 300 for managing V2X certificates, such as the certificates 116, will be described, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the concepts and technologies disclosed herein.

It also should be understood that the methods disclosed herein can be ended at any time and need not be performed in its entirety. Some or all operations of the methods, and/or substantially equivalent operations, can be performed by execution of computer-readable instructions included on a computer storage media, as defined herein. The term "computer-readable instructions," and variants thereof, as used herein, is used expansively to include routines, applications, application modules, program modules, programs, components, data structures, algorithms, and the like. Computer-readable instructions can be implemented on various system configurations including single-processor or multiprocessor systems or devices, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These states, operations, structural devices, acts, and modules may be implemented in software, in firmware, in special purpose digital logic, and any combination thereof. As used herein, the phrase "cause a processor to perform operations" and variants thereof is used to refer to causing one or more processors of one or more computing systems and/or devices disclosed herein to perform operations.

For purposes of illustrating and describing some of the concepts of the present disclosure, operations of the method 300 are described as being performed, at least in part, by the vehicle 102, the TOM server 110, the SCM system 112, and the CBC 114 via execution of one or more software modules. It should be understood that additional and/or alternative devices and/or network nodes can provide the functionality described herein via execution of one or more modules, applications, and/or other software. Thus, the illustrated embodiments are illustrative, and should not be viewed as being limiting in any way.

The method 300 will be described with reference to FIG. 3 and further reference to FIG. 1. The method 300 begins and proceeds to operation 302, where a vehicle 102, such as the vehicle 102A, or the SCM system 112 determines that a certificate 116 associated with the vehicle 102A is invalid. From operation 302, the method 300 proceeds to operation 304, where the vehicle 102 notifies the SCM system 112 that the certificate 116 is invalid—for example, in a CRL request 120. Also at operation 304, the SCM system 112 can determine that a CRL 118 is to be created to notify other vehicles, such as the vehicle 102N, that the certificate 116 is invalid. From operation 304, the method 300 proceeds to operation 306, where the SCM system 112 creates the CRL 118 including the certificate 116.

From operation 306, the method 300 proceeds to operation 308, where the SCM system 112 defines one or more areas to which the CRL 118 should be broadcast. In some embodiments, the TOM server 110 can, on behalf of the SCM system 112, define one or more areas to which the CRL 118 should be broadcast. From operation 308, the method 300 proceeds to operation 310, where the SCM system defines a frequency with which to broadcast the CRL 118 to the area(s) defined at operation 308. The frequency can be defined, for example, as every X minutes during peak travel times (6 AM to 10 AM and 3 PM to 7 PM, or other peak travel times determined by the TOM server 110). From operation 310, the method 300 proceeds to operation 312, where the SCM system 112 defines a time period during which to broadcast the CRL 118. The area(s), frequency, and time period are collectively referred to herein as configuration information.

From operation 312, the method 300 proceeds to operation 314, where the SCM system 112 sends the CRL 118, along with the configuration information, to the TOM server 110. From operation 314, the method 300 proceeds to operation 316, where the TOM server 110 receives the CRL 118 from the SCM system 112. From operation 316, the method 300 proceeds to operation 318, where the TOM server 110 formats the CRL 118 as a cell broadcast message. From operation 318, the method 300 proceeds to operation 320, where the TOM server 110 creates a cell broadcast request 122, including the CRL 118 formatted as a cell broadcast message and the configuration information.

From operation 320, the method 300 proceeds to operation 322, where the TOM server 110 sends the cell broadcast request 122 to the CBC 114. From operation 322, the method 300 proceeds to operation 324, where the CBC 114 receives the cell broadcast request 122 from the TOM server 110 and generates a cell broadcast message that includes the CRL 118. From operation 324, the method 300 proceeds to operation 326, where the CBC 114 broadcasts the cell broadcast message, including the CRL 118 data, in accordance with the configuration information set by the SCM system 112. From operation 326, the method 300 proceeds to operation 328, where the method 300 ends.

Figure 4:
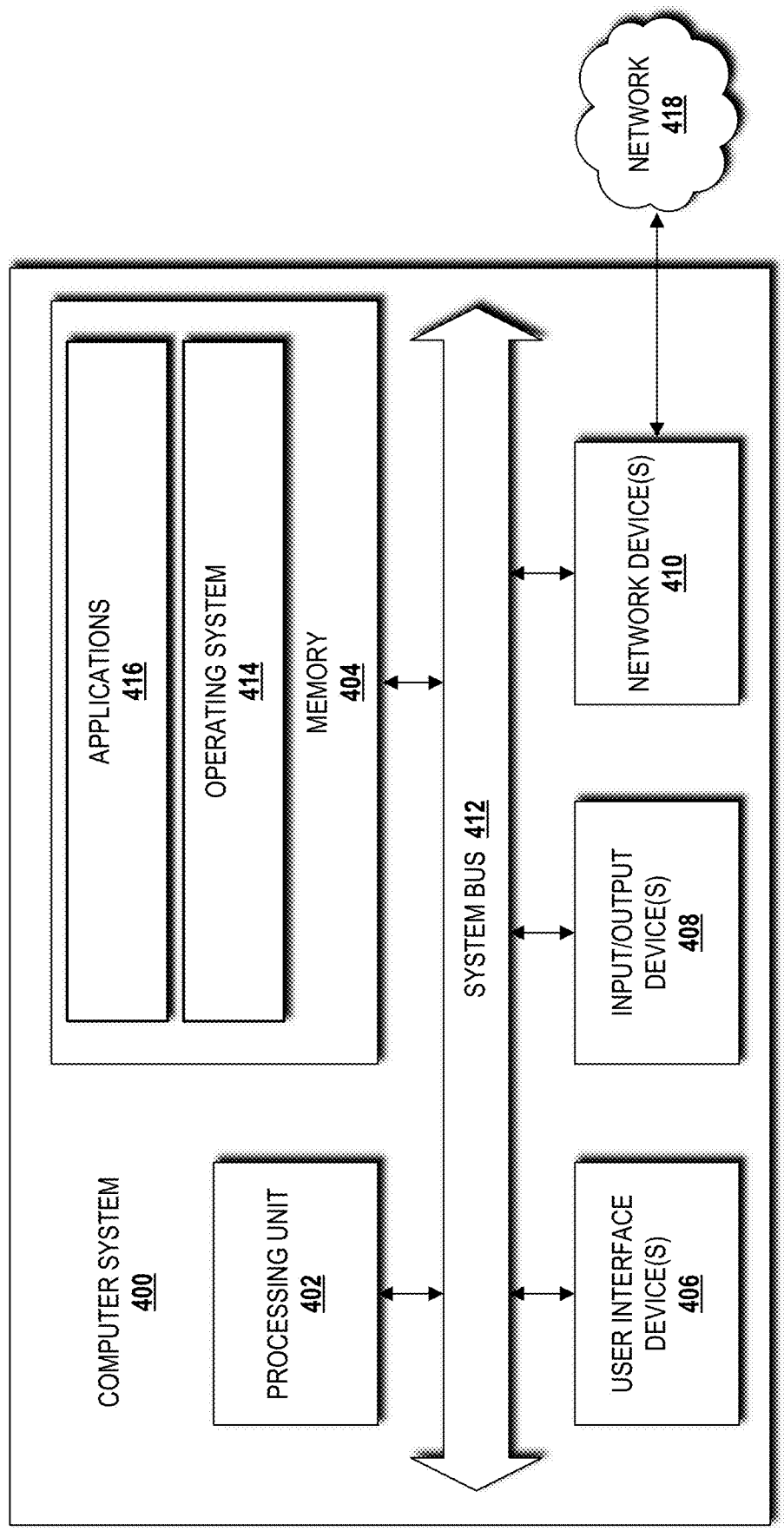
FIG. 4 is a block diagram illustrating an example computer system capable of implementing aspects of the embodiments presented herein.

FIG. 4 is a block diagram illustrating a computer system 400 configured to perform various operations disclosed herein. The computer system 400 includes a processing unit 402, a memory 404, one or more user interface devices 406, one or more input/output ("I/O") devices 408, and one or more network devices 410, each of which is operatively connected to a system bus 412. The system bus 412 enables bi-directional communication between the processing unit 402, the memory 404, the user interface devices 406, the I/O devices 408, and the network devices 410. In some embodiments, one or more components of the vehicle(s) 102, one or more components of the RAN 104 (e.g., one or more of the base stations 106), one or more components of the network 108, the TOM server 110, the SCM system 112, the CBC 114, or some combination thereof is/are configured, at least in part, like the computer system 400. It should be understood, however, that one or more of these elements may include additional functionality or include less functionality than now described.

The processing unit 402 may be a standard central processor that performs arithmetic and logical operations, a more specific purpose programmable logic controller ("PLC"), a programmable gate array, or other type of processor known to those skilled in the art and suitable for controlling the operation of the computer system 400. Processing units are generally known, and therefore are not described in further detail herein.

The memory 404 communicates with the processing unit 402 via the system bus 412. In some embodiments, the memory 404 is operatively connected to a memory controller (not shown) that enables communication with the processing unit 402 via the system bus 412. The illustrated memory 404 includes an operating system and one or more applications 416.

The operating system 414 can include, but is not limited to, members of the WINDOWS, WINDOWS CE, WINDOWS MOBILE, and/or WINDOWS PHONE families of operating systems from MICROSOFT CORPORATION, the LINUX family of operating systems, the SYMBIAN family of operating systems from SYMBIAN LIMITED, the BREW family of operating systems from QUALCOMM CORPORATION, the MAC OS and/or iOS families of operating systems from APPLE INC., the FREEBSD family of operating systems, the SOLARIS family of operating systems from ORACLE CORPORATION, other operating systems such as proprietary operating systems, and the like.

The user interface devices 406 may include one or more devices with which a user accesses the computer system 400. The user interface devices 406 may include, but are not limited to, computers, servers, personal digital assistants, telephones (e.g., cellular, IP, or landline), or any suitable computing devices. The I/O devices 408 enable a user to interface with the program modules. In one embodiment, the I/O devices 408 are operatively connected to an I/O controller (not shown) that enables communication with the processing unit 402 via the system bus 412. The I/O devices 408 may include one or more input devices, such as, but not limited to, a keyboard, a mouse, a touchscreen, or an electronic stylus. Further, the I/O devices 408 may include one or more output devices, such as, but not limited to, a display screen or a printer.

The network devices 410 enable the computer system 400 to communicate with other networks or remote systems via a network 418 (e.g., the RAN 104 and the network 108). Examples of the network devices 410 include, but are not limited to, a modem, a radio frequency ("RF") or infrared ("IR") transceiver, a telephonic interface, a bridge, a router, or a network card. The network 418 may include a wireless network such as, but not limited to, a WLAN such as a WI-FI network, a WWAN, a wireless PAN ("WPAN") such as BLUETOOTH, or a wireless MAN ("WMAN"). Alternatively, the network 418 may be a wired network such as, but not limited to, a WAN such as the Internet, a LAN such as the Ethernet, a wired PAN, or a wired MAN.

Figure 5:
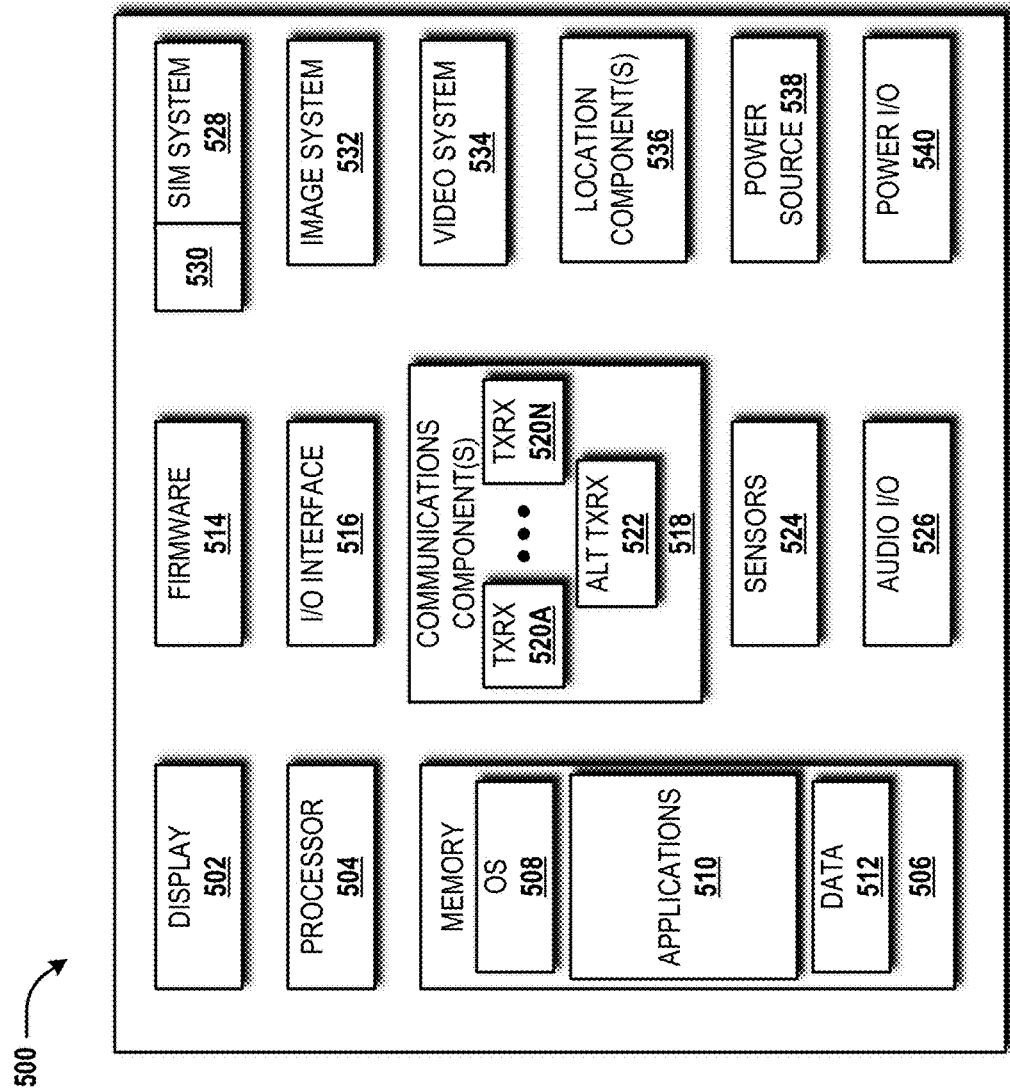
FIG. 5 is a block diagram illustrating an example mobile device capable of implementing aspects of the embodiments disclosed herein.

Turning now to FIG. 5, an illustrative mobile device 500 and components thereof will be described. In some embodiments, the mobile device 500 is configured to integrate with the vehicle 102 to provide various functionality described herein. While connections are not shown between the various components illustrated in FIG. 5, it should be understood that some, none, or all of the components illustrated in FIG. 5 can be configured to interact with one another to carry out various device functions. In some embodiments, the components are arranged so as to communicate via one or more busses (not shown). Thus, it should be understood that FIG. 5 and the following description are intended to provide a general understanding of a suitable environment in which various aspects of embodiments can be implemented, and should not be construed as being limiting in any way.

As illustrated in FIG. 5, the mobile device 500 can include a display 502 for displaying data. According to various embodiments, the display 502 can be configured to display network connection information, various graphical user interface ("GUI") elements, text, images, video, virtual keypads and/or keyboards, messaging data, notification messages, metadata, Internet content, device status, time, date, calendar data, device preferences, map and location data, combinations thereof, and/or the like. The mobile device 500 also can include a processor 504 and a memory or other data storage device ("memory") 506. The processor 504 can be configured to process data and/or can execute computer-executable instructions stored in the memory 506. The computer-executable instructions executed by the processor 504 can include, for example, an operating system 508, one or more applications 510, other computer-executable instructions stored in the memory 506, or the like. In some embodiments, the applications 510 also can include a UI application (not illustrated in FIG. 5).

The UI application can interface with the operating system 508 to facilitate user interaction with functionality and/or data stored at the mobile device 500 and/or stored elsewhere. In some embodiments, the operating system 508 can include a member of the SYMBIAN OS family of operating systems from SYMBIAN LIMITED, a member of the WINDOWS MOBILE OS and/or WINDOWS PHONE OS families of operating systems from MICROSOFT CORPORATION, a member of the PALM WEBOS family of operating systems from HEWLETT PACKARD CORPORATION, a member of the BLACKBERRY OS family of operating systems from RESEARCH IN MOTION LIMITED, a member of the IOS family of operating systems from APPLE INC., a member of the ANDROID OS family of operating systems from GOOGLE INC., and/or other operating systems. These operating systems are merely illustrative of some contemplated operating systems that may be used in accordance with various embodiments of the concepts and technologies described herein and therefore should not be construed as being limiting in any way.

The UI application can be executed by the processor 504 to aid a user in data communications, entering/deleting data, entering and setting user IDs and passwords for device access, configuring settings, manipulating content and/or settings, multimode interaction, interacting with other applications 510, and otherwise facilitating user interaction with the operating system 508, the applications 510, and/or other types or instances of data 512 that can be stored at the mobile device 500.

The applications 510, the data 512, and/or portions thereof can be stored in the memory 506 and/or in a firmware 514, and can be executed by the processor 504. The firmware 514 also can store code for execution during device power up and power down operations. It can be appreciated that the firmware 514 can be stored in a volatile or non-volatile data storage device including, but not limited to, the memory 506 and/or a portion thereof.

The mobile device 500 also can include an input/output ("I/O") interface 516. The I/O interface 516 can be configured to support the input/output of data such as location information, presence status information, user IDs, passwords, and application initiation (start-up) requests. In some embodiments, the I/O interface 516 can include a hardwire connection such as a universal serial bus ("USB") port, a mini-USB port, a micro-USB port, an audio jack, a PS2 port, an IEEE 1394 ("FIREWIRE") port, a serial port, a parallel port, an Ethernet (RJ45) port, an RJ11 port, a proprietary port, combinations thereof, or the like. In some embodiments, the mobile device 500 can be configured to synchronize with another device to transfer content to and/or from the mobile device 500. In some embodiments, the mobile device 500 can be configured to receive updates to one or more of the applications 510 via the I/O interface 516, though this is not necessarily the case. In some embodiments, the I/O interface 516 accepts I/O devices such as keyboards, keypads, mice, interface tethers, printers, plotters, external storage, touch/multi-touch screens, touch pads, trackballs, joysticks, microphones, remote control devices, displays, projectors, medical equipment (e.g., stethoscopes, heart monitors, and other health metric monitors), modems, routers, external power sources, docking stations, combinations thereof, and the like. It should be appreciated that the I/O interface 516 may be used for communications between the mobile device 500 and a network device or local device.

The mobile device 500 also can include a communications component 518. The communications component 518 can be configured to interface with the processor 504 to facilitate wired and/or wireless communications with one or more networks described herein. In some embodiments, the communications component 518 includes a multimode communications subsystem for facilitating communications via the cellular network and one or more other networks.

The communications component 518, in some embodiments, includes one or more transceivers. The one or more transceivers, if included, can be configured to communicate over the same and/or different wireless technology standards with respect to one another. For example, in some embodiments, one or more of the transceivers of the communications component 518 may be configured to communicate using GSM, CDMAONE, CDMA2000, LTE, and various other 2G, 2.5G, 3G, 4G, 5G, and greater generation technology standards. Moreover, the communications component 518 may facilitate communications over various channel access methods (which may or may not be used by the aforementioned standards) including, but not limited to, TDMA, FDMA, W-CDMA, OFDM, SDMA, and the like.

In addition, the communications component 518 may facilitate data communications using GPRS, EDGE, the HSPA protocol family including HSDPA, EUL or otherwise termed HSUPA, HSPA+, and various other current and future wireless data access standards. In the illustrated embodiment, the communications component 518 can include a first transceiver ("TxRx") 520A that can operate in a first communications mode (e.g., GSM). The communications component 518 also can include an $N^{th}$ transceiver ("TxRx") 520N that can operate in a second communications mode relative to the first transceiver 520A (e.g., UMTS). While two transceivers 520A-520N (hereinafter collectively and/or generically referred to as "transceivers 520") are shown in FIG. 5, it should be appreciated that less than two, two, and/or more than two transceivers 520 can be included in the communications component 518.

The communications component 518 also can include an alternative transceiver ("Alt TxRx") 522 for supporting other types and/or standards of communications. According to various contemplated embodiments, the alternative transceiver 522 can communicate using various communications technologies such as, for example, WI-FI, WIMAX, BLUETOOTH, infrared, infrared data association ("IRDA"), near field communications ("NFC"), other RF technologies, combinations thereof, and the like. In some embodiments, the communications component 518 also can facilitate reception from terrestrial radio networks, digital satellite radio networks, internet-based radio service networks, combinations thereof, and the like. The communications component 518 can process data from a network such as the Internet, an intranet, a broadband network, a WI-FI hotspot, an Internet service provider ("ISP"), a digital subscriber line ("DSL") provider, a broadband provider, combinations thereof, or the like.

The mobile device 500 also can include one or more sensors 524. The sensors 524 can include temperature sensors, light sensors, air quality sensors, movement sensors, accelerometers, magnetometers, gyroscopes, infrared sensors, orientation sensors, noise sensors, microphones proximity sensors, combinations thereof, and/or the like. Additionally, audio capabilities for the mobile device 500 may be provided by an audio I/O component 526. The audio I/O component 526 of the mobile device 500 can include one or more speakers for the output of audio signals, one or more microphones for the collection and/or input of audio signals, and/or other audio input and/or output devices.

The illustrated mobile device 500 also can include a subscriber identity module ("SIM") system 528. The SIM system 528 can include a universal SIM ("USIM"), a universal integrated circuit card ("UICC") and/or other identity devices. The SIM system 528 can include and/or can be connected to or inserted into an interface such as a slot interface 530. In some embodiments, the slot interface 530 can be configured to accept insertion of other identity cards or modules for accessing various types of networks. Additionally, or alternatively, the slot interface 530 can be configured to accept multiple subscriber identity cards. Because other devices and/or modules for identifying users and/or the mobile device 500 are contemplated, it should be understood that these embodiments are illustrative, and should not be construed as being limiting in any way.

The mobile device 500 also can include an image capture and processing system 532 ("image system"). The image system 532 can be configured to capture or otherwise obtain photos, videos, and/or other visual information. As such, the image system 532 can include cameras, lenses, charge-coupled devices ("CCDs"), combinations thereof, or the like. The mobile device 500 may also include a video system 534. The video system 534 can be configured to capture, process, record, modify, and/or store video content. Photos and videos obtained using the image system 532 and the video system 534, respectively, may be added as message content to an MMS message, email message, and sent to another device. The video and/or photo content also can be shared with other devices via various types of data transfers via wired and/or wireless communication devices as described herein.

The mobile device 500 also can include one or more location components 536. The location components 536 can be configured to send and/or receive signals to determine a geographic location of the mobile device 500. According to various embodiments, the location components 536 can send and/or receive signals from global positioning system ("GPS") devices, assisted-GPS ("A-GPS") devices, WI-FI/WIMAX and/or cellular network triangulation data, combinations thereof, and the like. The location component 536 also can be configured to communicate with the communications component 518 to retrieve triangulation data for determining a location of the mobile device 500. In some embodiments, the location component 536 can interface with cellular network nodes, telephone lines, satellites, location transmitters and/or beacons, wireless network transmitters and receivers, combinations thereof, and the like. In some embodiments, the location component 536 can include and/or can communicate with one or more of the sensors 524 such as a compass, an accelerometer, and/or a gyroscope to determine the orientation of the mobile device 500. Using the location component 536, the mobile device 500 can generate and/or receive data to identify its geographic location, or to transmit data used by other devices to determine the location of the mobile device 500. The location component 536 may include multiple components for determining the location and/or orientation of the mobile device 500.

The illustrated mobile device 500 also can include a power source 538. The power source 538 can include one or more batteries, power supplies, power cells, and/or other power subsystems including alternating current ("AC") and/or direct current ("DC") power devices. The power source 538 also can interface with an external power system or charging equipment via a power I/O component 540. Because the mobile device 500 can include additional and/or alternative components, the above embodiment should be understood as being illustrative of one possible operating environment for various embodiments of the concepts and technologies described herein. The described embodiment of the mobile device 500 is illustrative, and should not be construed as being limiting in any way.

As used herein, communication media includes computer-executable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared, and other wireless media. Combinations of the any of the above should also be included within the scope of computer-readable media.

By way of example, and not limitation, computer storage media may include volatile and non-volatile, removable and non-removable media implemented in any method or technology for storage of information such as computer-executable instructions, data structures, program modules, or other data. For example, computer media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the mobile device 500 or other devices or computers described herein, such as the computer system 400 described above with reference to FIG. 4. For purposes of the claims, the phrase "computer-readable storage medium" and variations thereof, does not include waves, signals, and/or other transitory and/or intangible communication media, per se.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations may take place in the mobile device 500 in order to store and execute the software components presented herein. It is also contemplated that the mobile device 500 may not include all of the components shown in FIG. 5, may include other components that are not explicitly shown in FIG. 5, or may utilize an architecture completely different than that shown in FIG. 5.

Figure 6:
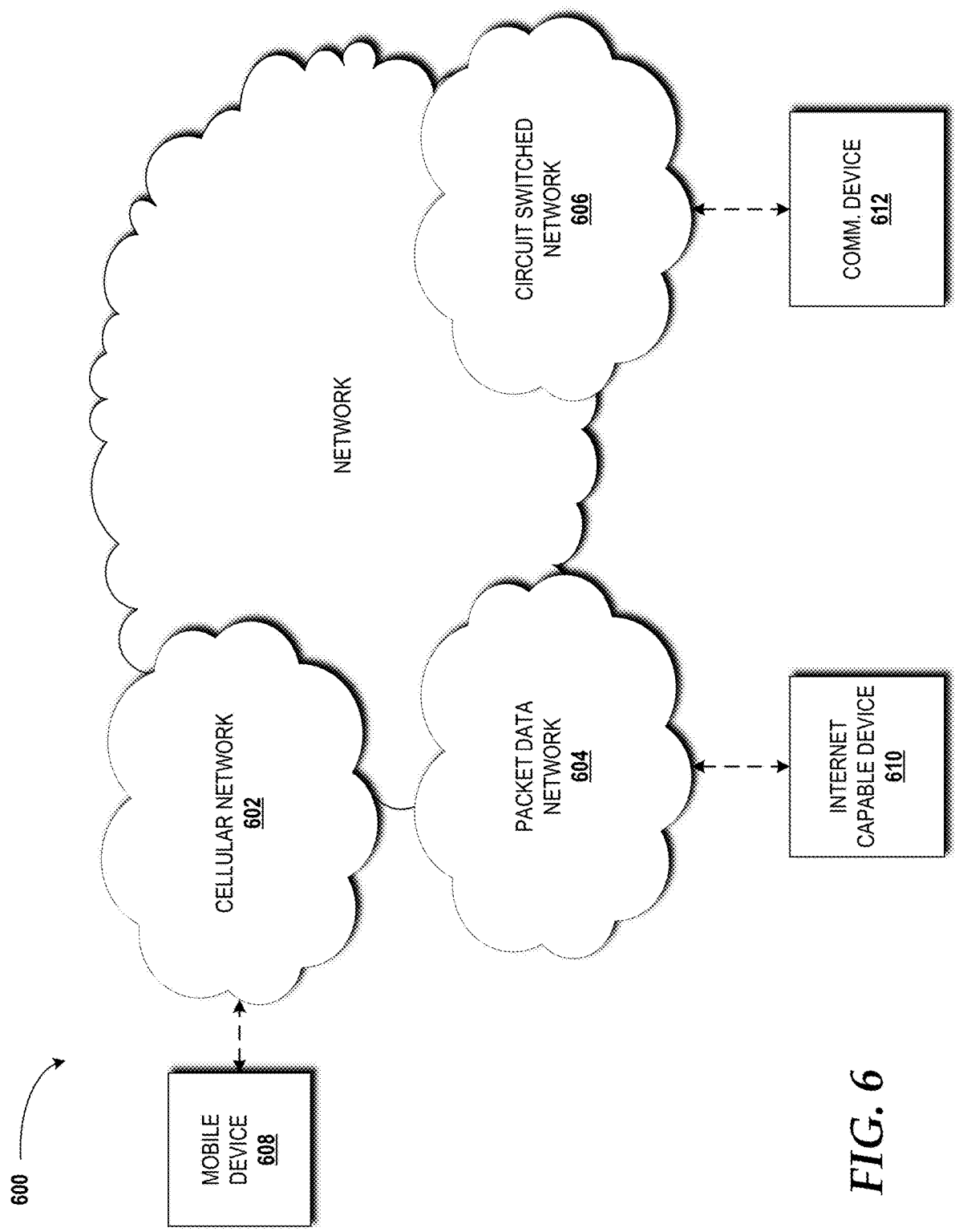
FIG. 6 is a diagram illustrating a network, according to an illustrative embodiment.

Turning now to FIG. 6, details of a network 600 are illustrated, according to an illustrative embodiment. The network 600 includes a cellular network 602, a packet data network 604, and a circuit switched network 606 (e.g., a public switched telephone network). The network 600 can include the network 108 and the RAN 104 illustrated and described with reference to FIG. 1.

The cellular network 602 includes various components such as, but not limited to, the RAN 104, the base stations 106, base transceiver stations ("BTSs"), NodeBs or eNodeBs, base station controllers ("BSCs"), radio network controllers ("RNCs"), mobile switching centers ("MSCs"), mobility management entities ("MMEs"), short message service centers ("SMSCs"), multimedia messaging service centers ("MMSCs"), home location registers ("HLRs"), home subscriber servers ("HSSs"), visitor location registers ("VLRs"), charging platforms, billing platforms, voicemail platforms, GPRS core network components, location service nodes, and the like. The cellular network 602 also includes radios and nodes for receiving and transmitting voice, data, and combinations thereof to and from radio transceivers, networks, the packet data network 604, and the circuit switched network 606.

A mobile communications device 612, such as, for example, a cellular telephone, a user equipment, a mobile terminal, a PDA, a laptop computer, a handheld computer, the vehicle 102, and combinations thereof, can be operatively connected to the cellular network 602. The cellular network 602 can be configured as a 2G GSM network and can provide data communications via GPRS and/or EDGE. Additionally, or alternatively, the cellular network 602 can be configured as a 3G UMTS network and can provide data communications via the HSPA protocol family, for example, HSDPA, EUL (also referred to as HSUPA), and HSPA+. The cellular network 602 also is compatible with 4G mobile communications standards such as LTE, or the like, as well as evolved and future mobile standards.

The packet data network 604 includes various devices, for example, servers, computers, databases, and other devices in communication with one another, as is generally known. In some embodiments, the packet data network 604 is or includes one or more WI-FI networks, each of which can include one or more WI-FI access points, routers, switches, and other WI-FI network components. The packet data network 604 devices are accessible via one or more network links. The servers often store various files that are provided to a requesting device such as, for example, a computer, a terminal, a smartphone, or the like. Typically, the requesting device includes software (a "browser") for executing a web page in a format readable by the browser or other software. Other files and/or data may be accessible via "links" in the retrieved files, as is generally known. In some embodiments, the packet data network 604 includes or is in communication with the Internet. The circuit switched network 606 includes various hardware and software for providing circuit switched communications. The circuit switched network 606 may include, or may be, what is often referred to as a plain old telephone system ("POTS"). The functionality of a circuit switched network 606 or other circuit-switched network are generally known and will not be described herein in detail.

The illustrated cellular network 602 is shown in communication with the packet data network 604 and a circuit switched network 606, though it should be appreciated that this is not necessarily the case. One or more Internet-capable devices 610, for example, a PC, a laptop, a portable device, or another suitable device, can communicate with one or more cellular networks 602, and devices connected thereto, through the packet data network 604. It also should be appreciated that the Internet-capable device 610 can communicate with the packet data network 604 through the circuit switched network 606, the cellular network 602, and/or via other networks (not illustrated).

As illustrated, a communications device 612, for example, a telephone, facsimile machine, modem, computer, or the like, can be in communication with the circuit switched network 606, and therethrough to the packet data network 604 and/or the cellular network 602. It should be appreciated that the communications device 612 can be an Internet-capable device, and can be substantially similar to the Internet-capable device 610.

Based on the foregoing, it should be appreciated that concepts and technologies for V2X certificate management have been disclosed herein. Although the subject matter presented herein has been described in language specific to computer structural features, methodological and transformative acts, specific computing machinery, and computer-readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the subject disclosure.

We claim:

1. A method comprising:
    receiving, by a traffic optimization management server system comprising a processor, a certificate revocation list from a security credential management system, wherein the certificate revocation list identifies a certificate that has been determined to be invalid, and wherein the certificate is utilized by a vehicle for secure communications;
    receiving, by the traffic optimization management server system, configuration information from the security credential management system, wherein the configuration information specifies how to configure a cell broadcast message for broadcasting the certificate revocation list to at least one cell of a cellular network, wherein the configuration information further specifies that the certificate revocation list is to be broadcast to the at least one cell of the cellular network in accordance with a frequency to be determined based, at least in part, upon a peak travel time;
    determining, by the traffic optimization management server system, the peak travel time;
    determining, by the traffic optimization management server system, the frequency based, at least in part, upon the peak travel time;
    formatting, by the traffic optimization management server system, the certificate revocation list as the cell broadcast message in accordance with the configuration information;
    creating, by the traffic optimization management server system, a cell broadcast request directed to a cell broadcast center, wherein the cell broadcast request comprises the certificate revocation list formatted as the cell broadcast message; and
    sending, by the traffic optimization management server system, the cell broadcast request to the cell broadcast center to instruct the cell broadcast center to broadcast the certificate revocation list as the cell broadcast message to the at least one cell of the cellular network in accordance with the frequency.

2. The method of claim 1, wherein the certificate revocation list is generated by the security credential management system in response to the security credential management system determining that the certificate is invalid.

3. The method of claim 1, wherein the certificate revocation list is generated by the security credential management system in response to a request received from the vehicle.

4. The method of claim 1, wherein the certificate that has been determined to be invalid is expired.

5. The method of claim 1, wherein the configuration information comprises a time period during which the certificate revocation list is to be broadcast to the at least one cell of the cellular network.

6. A computer-readable storage medium comprising computer-executable instructions that, when executed by a processor of a traffic optimization management server system, causes the processor to perform operations comprising:

receiving a certificate revocation list from a security credential management system, wherein the certificate revocation list identifies a certificate that has been determined to be invalid, and wherein the certificate is utilized by a vehicle for secure communications;

receiving configuration information from the security credential management system, wherein the configuration information specifies how to configure a cell broadcast message for broadcasting the certificate revocation list to at least one cell of a cellular network, wherein the configuration information further specifies that the certificate revocation list is to be broadcast to the at least one cell of the cellular network in accordance with a frequency to be determined based, at least in part, upon a peak travel time determining the peak travel time, determining the frequency based, at least in part, upon the peak travel time, formatting the certificate revocation list as the cell broadcast message in accordance with the configuration information;

creating a cell broadcast request directed to a cell broadcast center, wherein the cell broadcast request comprises the certificate revocation list formatted as the cell broadcast message; and sending the cell broadcast request to the cell broadcast center to instruct the cell broadcast center to broadcast the certificate revocation list as the cell broadcast message to the at least one cell of the cellular network in accordance with the frequency.

7. The computer-readable storage medium of claim 6, wherein the certificate revocation list is generated by the security credential management system in response to the security credential management system determining that the certificate is invalid.

8. The computer-readable storage medium of claim 6, wherein the certificate revocation list is generated by the security credential management system in response to a request received from the vehicle.

9. The computer-readable storage medium of claim 6, wherein the certificate that has been determined to be invalid is expired.

10. The computer-readable storage medium of claim 6, wherein the configuration information comprises a time period during which the certificate revocation list is to be broadcast to the at least one cell of the cellular network.

11. A traffic optimization management server system comprising:

a processor; and a memory that stores instructions that, when executed by the processor, cause the processor to perform operations comprising receiving a certificate revocation list from a security credential management system, wherein the certificate revocation list identifies a certificate that has been determined to be invalid, and wherein the certificate is utilized by a vehicle for secure communications, receiving configuration information from the security credential management system, wherein the configuration information specifies how to configure a cell broadcast message for broadcasting the certificate revocation list to at least one cell of a cellular network, wherein the configuration information further specifies that the certificate revocation list is to be broadcast to the at least one cell of the cellular network in accordance with a frequency to be determined based, at least in part, upon a peak travel time, determining the peak travel time, determining the frequency based, at least in part, upon the peak travel time, formatting the certificate revocation list as the cell broadcast message in accordance with the configuration information, creating a cell broadcast request directed to a cell broadcast center, wherein the cell broadcast request comprises the certificate revocation list formatted as the cell broadcast message, and sending the cell broadcast request to the cell broadcast center to instruct the cell broadcast center to broadcast the certificate revocation list as the cell broadcast message to the at least one cell of the cellular network in accordance with the frequency.

12. The traffic optimization management server system of claim 11, wherein the certificate revocation list is generated by the security credential management system in response to the security credential management system determining that the certificate is invalid.

13. The traffic optimization management server system of claim 11, wherein the certificate revocation list is generated by the security credential management system in response to a request received from the vehicle.

14. The traffic optimization management server system of claim 11, wherein the configuration information further specifies a time period during which the certificate revocation list is to be broadcast to the at least one cell of the cellular network.

15. The method of claim 1, further comprising calling, by the system, an application programming interface exposed by the cell broadcast center; and wherein sending, by the system, the cell broadcast request to the cell broadcast center comprises sending, by the system, the cell broadcast request to the cell broadcast center via the application programming interface.

16. The computer-readable storage medium of claim 6, wherein the operations further comprise calling an application programming interface exposed by the cell broadcast center; and wherein sending the cell broadcast request to the cell broadcast center comprises sending the cell broadcast request to the cell broadcast center via the application programming interface.

17. The traffic optimization management server system of claim 11, wherein the operations further comprise calling an application programming interface exposed by the cell broadcast center; and wherein sending the cell broadcast request to the cell broadcast center comprises sending the cell broadcast request to the cell broadcast center via the application programming interface.

* * * * *